June 16, 1959 W. M. REESE 2,890,721
DIFFERENTIAL PRESSURE RESPONSIVE DEVICE
Filed April 28, 1955 2 Sheets-Sheet 1

INVENTOR.
William Maurice Reese
BY
*[signature]*
Attorneys

June 16, 1959  W. M. REESE  2,890,721
DIFFERENTIAL PRESSURE RESPONSIVE DEVICE
Filed April 28, 1955
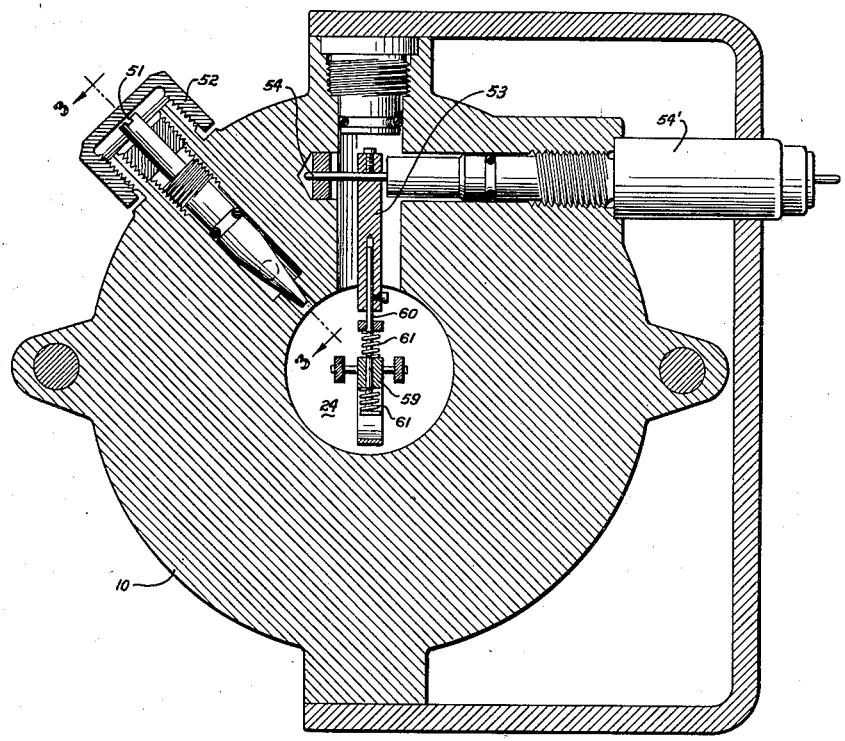
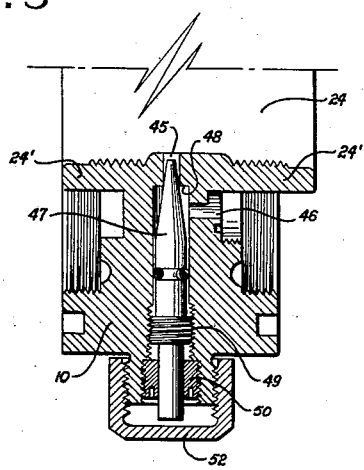
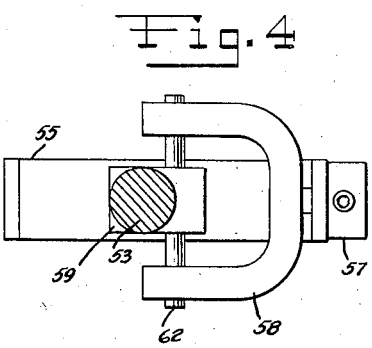
INVENTOR.
William Maurice Reese United States Patent Office 2,890,721
Patented June 16, 1959

2,890,721

DIFFERENTIAL PRESSURE RESPONSIVE DEVICE

William M. Reese, Odessa, Tex.

Application April 28, 1955, Serial No. 504,440

10 Claims. (Cl. 137—779)

This invention relates to improvements in differential pressure responsive devices of the character used for measuring pressures in different environments such, for instance, as the drop in pressure through an orifice plate in a flow line or between separate chambers, and for other purpoes.

It has been proposed heretofore to construct a differential pressure responsive device of the character described, which uses two opposed bellows mounted on a center plate and adapted for open communication with each other through a passageway controlled by suitable valves. The pressures to be measured are applied respectively to the exteriors of the two bellows, and the bellows move in response thereto, and one of these bellows controls the pressure responsive element such, for instance, as a meter, indicator or recorder.

It has been the practice heretofore with such devices to use range springs in the low pressure chamber, usually externally of the low pressure bellows, for controlling the action of the latter and the position of the valves connected therewith. Where the range of differential is very small, it is necessary to use very fine springs, and yet when a very large range is desired, appreciably heavier springs are needed which may be located externally of the lower pressure bellows. The construction of the device does not ordinarily lend itself to changes in the range springs, using springs of different sizes, especially when a very low differential of range is involved.

This problem has been solved by the location of a compression spring within the center plate chamber and connected with the valve stem so as to be used alone when a very low differential is involved and to be used in addition to the conventional range springs when a very high differential is involved. Either of these sets of springs may be used alone without the other, or they may be used together, according to the desired range of differential for which the device is adapted.

This embodiment of the invention is illustrated in the accompanying drawings, in which:

Fig. 2 is a detailed cross-section therethrough, substantially on the line 2—2 in Fig. 1;

Fig. 3 is a similar view on the line 3—3 in Fig. 2; and

Fig. 4 is a detail cross section, partially in plan.

Figure 1:
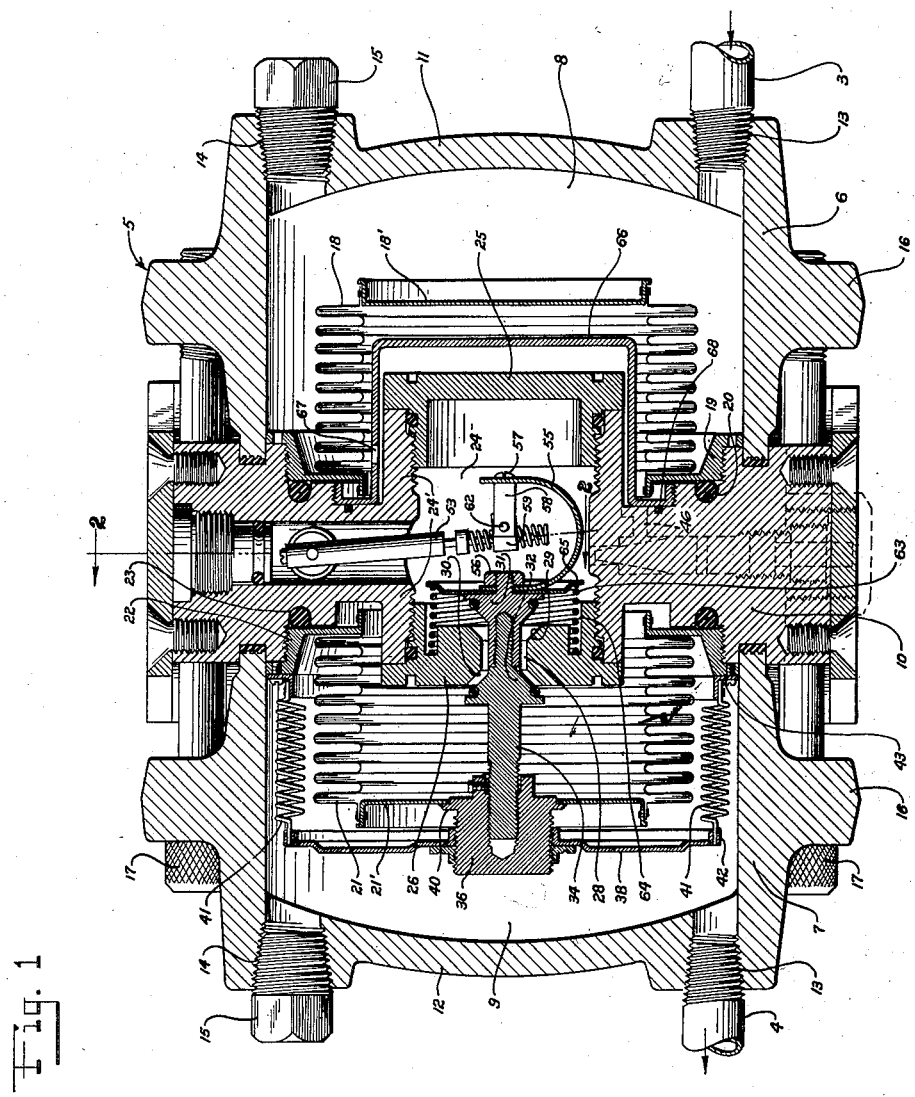
Fig. 1 is a longitudinal section through a differential pressure responsive device embodying this invention.

While the invention is adapted for many uses as a differential pressure responsive device, for measuring, controlling or indicating pressure differentials, one embodiment of the invention is illustrated as a differential flow meter to measure the drop in pressure through an orifice plate in a flow line. A typical gas or liquid flow line is provided with an orifice plate therein. Connected with the flow line on opposite sides of the orifice plate are pipes 3 and 4, respectively, which extend to the differential pressure responsive device constituting this invention, being connected, respectively, with the high and low pressure chambers thereof.

The embodiment of this device which is illustrated in the drawings comprises a housing generally indicated at 5, the construction of which is shown in Fig. 1. The housing 5 includes a high pressure cylinder or body 6 and a corresponding low pressure cylinder or body 7 arranged in axial alignment with each other and enclosing, respectively, high and low pressure chambers 8 and 9. The chambers 8 and 9 are separated from each other by a center plate 10.

The housing cylinder or body 6 is closed at its outer end by a head 11, while the cylinder or body 7 is likewise closed at its outer end by a head 12. The heads 11 and 12 are shown as formed in one integral piece with the cylinders or bodies 6 and 7, respectively, although they may be separate therefrom if desired and secured rigidly thereto. Each of the heads 11 and 12 is provided with tapped connector openings 13 and 14 of the same or of different diameters, for instance, one-quarter inch and one-half inch, respectively. One set of the openings is connected with the pipes 3 and 4, while the other set is closed by plugs 15. Either set of tapped connector openings may be used according to the size of pipes to be connected therewith.

Each of the cylinders or bodies 6 and 7 is provided with radially disposed flanges or lugs 16 for connecting together the cylinders or bodies 6 and 7 through cap screws or tie bolts 17. Several such tie bolts may be used as required.

Mounted within the high pressure chamber 8 is a bellows 18 closed at its outer end by a plate 18' and exposed externally to the pressure within the high pressure chamber 8. The inner end of the bellows 18 is sealed to a nut 19 screw-threaded into a countersunk portion in the adjacent lateral face of the center plate 10. A sealing ring is shown at 20, preferably which may be a flat gasket or an O-ring, which effects a complete sealing from the inside of the bellows 18 around the periphery of the nut 19 into the chamber 8.

Mounted in the low pressure chamber 9 is a bellows 21 closed at its outer end by a plate 21', the periphery of which bellows is exposed to the pressure in the chamber 9. The inner end of the bellows 21 is sealed to a nut 22 screw-threaded into a recessed portion of the center plate 10 and provided with a peripheral seal at 23, corresponding with the connection at 19—20 described above.

The bellows 18 and 21 preferably have substantially equal effective areas and are both exposed externally to the liquid or gas within the chambers 8 and 9. The construction herein set forth provides for the use of larger bellows requiring several times the sealing fluid contained therein, which gives greater displacement with increased drive power. This provides several times the total calibrated travel as compared with other bellows heretofore used in instruments of this general type. The bellows 18 and 21 are filled with a suitable liquid that is adapted to flow back and forth in response to variations in pressure in the chambers 8 and 9.

The center plate 10 is provided with an axial passageway therethrough, formed with a cored out chamber 24 surrounded by oppositely extending sleeves 24'. The axial passageway is closed by plugs 25 and 26 at opposite ends thereof, preferably screw-threaded into the opposite sleeves 24' of center plate 10 and sealed thereto. The plug 25 forms a cap over the chamber 24 at the adjacent side of the center plate 10 and closes the chamber 24 against direct open communication with the interior of the high pressure bellows 18.

The plug 26 has a passageway 28 therethrough provided with high and low pressure valve seats 29 and 30, respectively, at opposite ends of said passageway, adapted to be engaged alternatively by valves 31 and 32, respectively, on a valve stem 34. The valves 31 and 32 are fixed to each other with their opposed faces spaced apart a distance greater than the distance between the valve seats 29 and 30 so that only one of these valves will engage its seat at a time and both valves may be open at the same time, as illustrated in Fig. 1. O-ring seals may be provided in the faces of the valves 31 and 32 for sealing the valves against the seats 29 and 30, respectively, or any other sealing means desirable may be used for this purpose.

The valve stem 34 is carried by a plug 36, having screw-threaded connection therewith, and secured rigidly to a plate 38. At its inner end, the plug 36 is provided with a surrounding flange 40 against which the end plate 21' of the bellows 21 abuts and is secured in sealed relation therewith.

The plate 38 normally is urged in an inward direction by range springs 41 spaced at intervals around the periphery of the low pressure bellows 21. Each of the range springs 41 is secured at one end to a peripheral ring connection 42 on the plate 38 and at its opposite end to a similar ring connection 43 secured to the adjacent lateral face of the nut 22 so as to extend parallel with the axis of the bellows 21 and normally tending to contract the latter and to move the valve 32 toward a closed or seated position.

The center plate 10 is provided with a by-pass passage (see Fig. 3) from the chamber 24 therein into the high pressure bellows 18. This by-pass passage is formed by a radial passage 45 in the center plate 10, open at one end to the chamber 24 and having a lateral outlet 46 into the high pressure bellows 18. These passages 45 and 46 will allow the free circulation of liquid from the chamber 24 which may be in open communication with the low pressure bellows 21 into the high pressure bellows 18.

This communication may be controlled by a pulsation dampener restriction valve 47 which is of the needle type, normally adjustable and adapted to engage a seat 48 intermediate the passages 45 and 46 to control the opening therebetween and communication therethrough. The valve 47 is adjustably mounted at 49 in the plate 10 and is held in place by a nut 50 screw-threaded into a projecting portion of the plate, as shown in Fig. 3. The extreme outer end of the valve 47 may be provided with a screw driver slot 51 or with other suitable means to be engaged for adjustment thereof when desired. A cap 52 closes the outer end of the valve and is removable for access thereto.

This valve 47 is adapted to be seated in a predetermined position so as to permit normal flow of liquid from one bellows to the other, but to restrict excessive flow due to greatly increased pulsating pressures. The normal flow between the bellows is controlled by the valves 31 and 32, being moved in accordance with the relative pressures in the high and low pressure bellows 18 and 21.

The valve stem 34 is adapted for connection with an arm 53 which extends downwardly in the chamber 24 of the center plate 10 from a shaft 54 at its upper end. The shaft 54 extends through a non-freezing bearing 54', of the type set forth in my application, Serial No. 210,132, filed February 9, 1951, now Patent No. 2,712,968. The shaft 54 may be connected with any suitable indicator, recorder or other device, which it may be desirable to actuate in response to the differential of pressure connected with the chambers 8 and 9.

The bellows 18 and 21 normally are filled with an incompressible liquid. Any variations in temperature which would change the volume of the liquid naturally would affect the operation of the arm 53, so long as a thermostatic liquid is used. While the free bellows 18 will compensate to a substantial extent for fluid expansion or contraction, a greater degree of control can be obtained by a thermostatic device connected between the valve stem 34 and the arm 53 so that any variations of temperature acting on the liquid in the bellows will affect the absolue zero of the instrument connected therewith.

One form of thermostatic element is illustrated in Fig. 1 and designated generally at 55. This is in the form of a bi-metallic bar connected at one end, as by a nut 56, with the outer end of the valve stem 34 substantially at the outer face of the valve 31, while the opposite end of the element 55 is connected at 57 with a U-shaped bracket 58 which embraces a slide block 59 on a rod 60 secured to the arm 53 and projecting axially therefrom. Coiled springs 61 are sleeved over the rod 60 on opposite sides of the block 59 and are fixed at their outer ends by suitable stops, while the inner ends of said springs bear yieldably upon the block, normally tending to center the latter.

The yoke 58 is pivoted at 62 to the block 59. These parts form a universal connection between the spring 55 and the arm 53 for moving the arm in accordance with the movement of the spring and of the valve stem 34. The thermostatic spring compensates for variations in temperature of the liquid contained in the bellows, as set forth more in detail in my prior application, Serial No. 411,039, filed February 18, 1954, now Patent No. 2,762,391.

While the range springs 41 may be used alone for controlling the action of the valves 31 and 32 and the flow of liquid between the bellows 18 and 21, such springs may be excessively heavy where there is only a low differential measured by the device, for instance, of the order of twenty inches or lower of water. I have found that much better effects can be obtained with such low differential by using a compression spring connected with the valve stem 34 and located within the center plate chamber 24, as indicated at 63. A coiled compression spring is used for this purpose.

The spring 63 surrounds the projecting end of the valve stem 34. At one end, the coiled compression spring 63 extends into an annular seat 64 formed in the adjacent end of the plug 26. The opposite end of the spring 63 bears against the peripheral portion of a plate 65, which is secured on the projecting end of the valve stem 34 beside the valve 31, being held in place by the nut 56. Upon removal of this nut, the plate 65 can be removed, and also the compression spring 63, when it is desired to use only the range springs 41, or to vary the size of such springs.

Thus, it is possible with the same construction to accommodate this device to a rather wide differential in pressures with no other changes except some variation of the range springs used.

Where the differential is very low, as of the order of twenty inches, for example, the range springs 41 would need to be made so fine as to be impractical and unsatisfactory. For such a low differential, according to this invention, the range springs 41 can be removed and the compression spring 63 be used alone to provide the needed spring action on the valves and the bellows. For larger differentials, the spring pressure can be provided by the range springs 41 alone, in which event the compression spring 63 may be removed, or where still larger pressures are involved, both sets of springs 41 and 63 may be used together, acting on the valve stem 34 to move the valves and the low pressure bellows connected therewith.

This provides the desired range of differential pressures which is made possible with very little variation and only the needed changes in the required size of spring or springs. The device is readily converted from one range to another by the user.

A fluid retainer cup 66 is assembled in the bellows 18, being secured to the center plate 10, as by a screwthreaded connection, and sealed thereto as at 68. The interior of this cup 66 is open to the outlet 46 from the dampening valve 47, whereby the contained fluid flows through the cup 66 and out of a hole 67 into the bellows 18. The purpose of this fluid retainer cup is to relieve a large part of the fluid head on the high pressure bellows 18, allowing this bellows to function freely upon contraction or expansion caused by temperature changes.

In other respects the construction and operation of this device are substantially the same as set forth and claimed in my prior applications, Serial No. 323,885, filed December 3, 1952, now Patent No. 2,762,392, Serial No. 384,608, filed October 7, 1953, now Patent No. 2,762,393, and Serial No. 411,039, filed February 18, 1954, now Patent No. 2,762,391.

While the invention has been illustrated and described in one embodiment, it is recognized that other variations and changes may be made therein without departing from the invention, as set forth in the claims.

I claim:

1. A differential pressure responsive device comprising a housing, a center plate dividing the housing into separate chambers, a bellows in each chamber, means for transmitting differentials of pressure between the bellows and for controlling said pressure, said center plate having a chamber therein, and a compression spring mounted in said center plate chamber and connected with the pressure controlling means and normally tending to urge said controlling means in one direction.

2. A differential pressure responsive device comprising a housing, a center plate dividing the housing into separate chambers, a bellows in each chamber, said center plate having a chamber therein with means of communication with one of the bellows and separate means of communication with the other bellows, means for controlling the communication of the last-mentioned means, and a compression spring connected with said controlling means and housed within said center plate chamber.

3. A differential pressure responsive device comprising a housing, a center plate dividing the housing into separate chambers, a bellows in each chamber, said center plate having a chamber therein with means of communication with one of the bellows and separate means of communication with the other bellows, means for controlling the communication of the last-mentioned means, a compression spring connected with said controlling means and housed within said center plate chamber, and additional spring means connected with the controlling means and mounted within one of the first-mentioned chambers externally of the bellows therein.

4. A differential pressure responsive device comprising a housing, a center plate dividing the housing into separate chambers, a bellows in each chamber, means for transmitting differentials of pressure between the bellows including an enlarged chamber within the center plate, means for controlling the transmission of pressure from one of the bellows to said center plate chamber, and a compression spring housed within the center plate chamber and connected with said controlling means and acting thereon normally tending to move the controlling means in one direction.

5. A differential pressure responsive device comprising a housing, a center plate dividing the housing into separate chambers, a bellows in each chamber, means for transmitting differentials of pressure between the bellows including an enlarged chamber within the center plate, means for controlling the transmission of pressure from one of the bellows to said center plate chamber, a compression spring housed within the center plate chamber and connected with said controlling means and acting thereon normally tending to move the controlling means in one direction, and additional spring means mounted within one of the first-mentioned chambers externally of the bellows therein and connected with the controlling means normally tending to move the controlling means in one direction.

6. A differential pressure responsive device comprising a housing, a center plate dividing the housing into separate chambers, a bellows in each chamber, means for transmitting differentials of pressure between the bellows including an enlarged chamber in the center plate, a plug closing one side of said last-mentioned chamber and having valve seats therein, a valve stem carrying valves in position to control the seats and extending through said plug, means connecting said valve stem with the adjacent bellows, a plate secured to the end of the valve stem and mounted within the center plate chamber, the plug having an annular seat therein facing toward the center plate chamber, and a coiled spring surrounding an end portion of the valve stem within the center plate chamber and interposed between the seat in the plug and the plate connected with the valve stem and acting on the latter normally tending to move the valves in one direction.

7. A differential pressure responsive device comprising a housing having a pressure chamber therein, a bellows having a portion thereof exposed to said pressure chamber and enclosing a liquid, pressure responsive means including an arm, means operatively connected with the bellows and movable thereby in response to variations in pressure acting on the bellows, a temperature compensating member connected with said means at one end and extending therefrom into proximity with the arm, a U-shaped yoke intermediate said temperature compensating member and said arm, said yoke being connected to the opposite end of said temperature compensating member, and means operatively connecting the yoke with the arm to form a universal connection therebetween.

8. A differential pressure responsive device comprising a housing having a pressure chamber therein, a bellows having a portion thereof exposed to said pressure chamber and enclosing a liquid, pressure responsive means including an arm, means operatively connected with the bellows and movable thereby in response to variations in pressure acting on the bellows, a temperature compensating member connected with said means at one end and extending therefrom into proximity with the arm, a yoke connected with the opposite end of said temperature compensating member, said yoke embracing the arm on opposite sides thereof, a block slidably mounted on the arm, means pivotally connecting the yoke with the block, and yieldable means acting on opposite sides of the block for transmitting movement from the yoke to the arm and providing a universal connection therebetween.

9. A differential pressure responsive device comprising a housing, a center plate dividing the housing into separate chambers, a bellows in each chamber, means for transmitting differentials of pressure between the bellows and for controlling said pressure, said center plate having a chamber therein, a compression spring mounted in said center plate chamber to urge said pressure controlling means in one direction, a temperature compensating member connected at one end to said pressure controlling means, a U-shaped yoke member connected to the other end of the temperature compensating member, and means operatively connecting the yoke member with a pressure responsive arm, whereby differentials in pressure between the bellows will produce a corresponding movement of the pressure responsive arm.

10. A differential pressure responsive device comprising a housing, a center plate dividing the housing into separate chambers, a bellows in each chamber, a fluid retainer cup enclosed within one of the bellows and having an opening therein into said bellows, means for transmitting differentials in pressure between the bellows through the interior of said cup and said opening, said center plate having a chamber therein, pressure controlling means mounted in said center plate chamber, and a compression spring mounted in said center plate chamber and connected with the pressure controlling means to urge said pressure controlling means in one direction.

References Cited in the file of this patent

UNITED STATES PATENTS

| | | |
|---|---|---|
| 2,632,474 | Jones | Mar. 24, 1953 |
| 2,664,749 | Jones | Jan. 5, 1954 |
| 2,691,305 | Frank | Oct. 12, 1954 |
| 2,762,391 | Reese | Sept. 11, 1956 |
| 2,762,392 | Reese | Sept. 11, 1956 |

UNITED STATES PATENT OFFICE

CERTIFICATE OF CORRECTION

Patent No. 2,890,721 June 16, 1959

William M. Reese

It is hereby certified that error appears in the above numbered patent requiring correction and that the said Letters Patent should read as corrected below.

In the grant, lines 1, 2 and 3, for "William M. Reese, of Odessa, Texas," read -- William M. Reese, of Odessa, Texas, assignor to Industrial Instrument Corporation, of Odessa, Texas, a corporation of Texas, --; line 12, for "William M. Reese, his heirs" read -- Industrial Instrument Corporation, its successors --; in the heading to the printed specification, line 3, for "William M. Reese, Odessa, Tex." read -- William M. Reese, Odessa, Tex., assignor to Industrial Instrument Corporation, Odessa, Tex., a corporation of Texas --.

Signed and sealed this 10th day of November 1959.

(SEAL)
Attest:

KARL H. AXLINE
Attesting Officer

ROBERT C. WATSON
Commissioner of Patents